(12) United States Patent
Lee

(10) Patent No.: US 10,793,474 B2
(45) Date of Patent: Oct. 6, 2020

(54) CERAMIC COMPOSITION

(71) Applicant: NATIONAL PINGTUNG UNIVERSITY OF SCIENCE & TECHNOLOGY, Pingtung County (TW)

(72) Inventor: Ying-Chieh Lee, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 0 days.

(21) Appl. No.: 16/264,764

(22) Filed: Feb. 1, 2019

(65) Prior Publication Data

US 2019/0241474 A1 Aug. 8, 2019

(30) Foreign Application Priority Data

Feb. 7, 2018 (TW) .............................. 107104362 A
Jul. 25, 2018 (TW) .............................. 107125738 A

(51) Int. Cl.
*C04B 35/057* (2006.01)
*C04B 33/13* (2006.01)
*C04B 33/32* (2006.01)
*C04B 33/135* (2006.01)
*C04B 35/195* (2006.01)

(52) U.S. Cl.
CPC .......... *C04B 35/057* (2013.01); *C04B 33/131* (2013.01); *C04B 33/1352* (2013.01); *C04B 33/323* (2013.01); *C04B 35/195* (2013.01); *C04B 2235/3201* (2013.01); *C04B 2235/3206* (2013.01); *C04B 2235/3208* (2013.01); *C04B 2235/3217* (2013.01); *C04B 2235/3232* (2013.01); *C04B 2235/3272* (2013.01); *C04B 2235/34* (2013.01); *C04B 2235/3418* (2013.01); *C04B 2235/442* (2013.01); *C04B 2235/448* (2013.01); *C04B 2235/77* (2013.01)

(58) Field of Classification Search
CPC ... C03B 33/131; C03B 33/323; C04B 35/057; C04B 33/131; C04B 33/323
See application file for complete search history.

(56) References Cited

U.S. PATENT DOCUMENTS

2018/0305254 A1* 10/2018 Ben Haha ............. C04B 7/3453

FOREIGN PATENT DOCUMENTS

CN           104479794 A    4/2015
WO    WO-2016202449 A1 * 12/2016 ............ C04B 28/021

* cited by examiner

*Primary Examiner* — Karl E Group
(74) *Attorney, Agent, or Firm* — WPAT, PC

(57) ABSTRACT

A ceramic composition which can be used as a sintering aid includes 1-2 mol % of magnesium oxide (MgO), 5-15 mol % of aluminum oxide ($Al_2O_3$), 25-40 mol % of silicon dioxide ($SiO_2$), 40-55 mol % of calcium oxide (CaO), 0.1-8 mol % of ferric oxide ($Fe_2O_3$), 0.1-2 mol % of sulfur trioxide ($SO_3$) and 0.1-2 mol % of titanium oxide ($TiO_2$). Alternatively, the ceramic composition includes 1-8 mol % of MgO, 5-15 mol % of $Al_2O_3$, 25-40 mol % of $SiO_2$, 40-55 mol % of CaO, 0.1-8 mol % of $Fe_2O_3$, 0.1-2 mol % of $SO_3$ and 0.9-2 mol % of $TiO_2$.

4 Claims, 2 Drawing Sheets

CERAMIC COMPOSITION

CROSS REFERENCE TO RELATED APPLICATIONS

The application claims the benefit of Taiwan application serial No. 107104362, filed Feb. 7, 2018, and Taiwan application serial No. 107125738, filed Jul. 25, 2018, the entire contents of which are incorporated herein by reference.

BACKGROUND OF THE INVENTION

1. Field of the Invention

The present invention generally relates to a ceramic composition and, more particularly, to a ceramic composition used as a sintering aid.

2. Description of the Related Art

In the process of sintering, a sintering aid is usually added to form a liquid phase such as a glass phase. Ceramic particles rearrange and viscous flow in the liquid phase. Therefore, the sintering temperature can be reduced, and the ceramic workpiece with a higher density can be obtained.

As an example, gehlenite (C2AS) is a conventional ceramic composition made of calcium aluminum silicate, which includes calcium oxide (CaO), aluminum oxide ($Al_2O_3$) and silicon dioxide ($SiO_2$). Gehlenite can be used to manufacture raw materials for glass and ceramics. Gehlenite is one of the feldspar which has a highest melting point of about 1550° C. Therefore, gehlenite has a limited effect on reducing the sintering temperature when it is used as the sintering aid. In light of this, it is necessary to provide a ceramic composition.

SUMMARY OF THE INVENTION

It is therefore an objective of the present invention to provide a ceramic composition which can be used as a sintering aid.

One embodiment of the present invention discloses a ceramic composition including 1-2 mol % of magnesium oxide (MgO), 5-15 mol % of aluminum oxide ($Al_2O_3$), 25-40 mol % of silicon dioxide ($SiO_2$), 40-55 mol % of calcium oxide (CaO), 0.1-8 mol % of ferric oxide ($Fe_2O_3$), 0.1-2 mol % of sulfur trioxide ($SO_3$) and 0.1-2 mol % of titanium oxide ($TiO_2$). Alternatively, the ceramic composition includes 1-8 mol % of MgO, 5-15 mol % of $Al_2O_3$, 25-40 mol % of $SiO_2$, 40-55 mol % of CaO, 0.1-8 mol % of $Fe_2O_3$, 0.1-2 mol % of $SO_3$ and 0.9-2 mol % of $TiO_2$. Accordingly, due to the ingredients (MgO, $Al_2O_3$, $SiO_2$, CaO, $Fe_2O_3$, $SO_3$ and $TiO_2$) and the specific ratio (1-8 mol % of MgO, 5-15 mol % of $Al_2O_3$, 25-40 mol % of $SiO_2$, 40-55 mol % of CaO, 0.1-8 mol % of $Fe_2O_3$, 0.1-2 mol % of $SO_3$ and 0.1-2 mol % of $TiO_2$), the ceramic composition has a melting point significantly lower than gehlenite. Therefore, the ceramic composition can be used as a sintering aid to effectively reduce sintering temperature, dramatically reduce the cost for manufacturing ceramic workpieces. Moreover, by co-sintering the ceramic clay with the ceramic composition including either 1-2 mol % of MgO or 0.9-2 mol % of $TiO_2$, a ceramic workpiece with an effectively improved bulk density can be obtained.

In an example, the ceramic composition includes 0.1-5 mol % of an alkali metal oxide. As such, by the addition of the alkali metal oxide, the ceramic composition can have a lower melting point. Therefore, when the ceramic composition is used as the sintering aid, the sintering temperature for manufacturing the ceramic workpieces is further reduced.

In an example, sum of mole percentages of MgO and $Fe_2O_3$ is larger than 4 mol %. As such, the sintering temperature for manufacturing the ceramic workpieces can be further reduced.

In an example, the alkali metal oxide can be potassium oxide ($K_2O$), sodium oxide ($Na_2O$), rubidium oxide ($Rb_2O$) or cesium oxide ($Cs_2O$). As such, by the melting point of $Na_2O$ (1132° C.), the melting point of $K_2O$ (770° C.), the melting point of $Rb_2O$ (>500° C.), the melting point of $Cs_2O$ (490° C.), the ceramic composition can be used to effectively reduce the sintering temperature for manufacturing the ceramic workpieces.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1A:
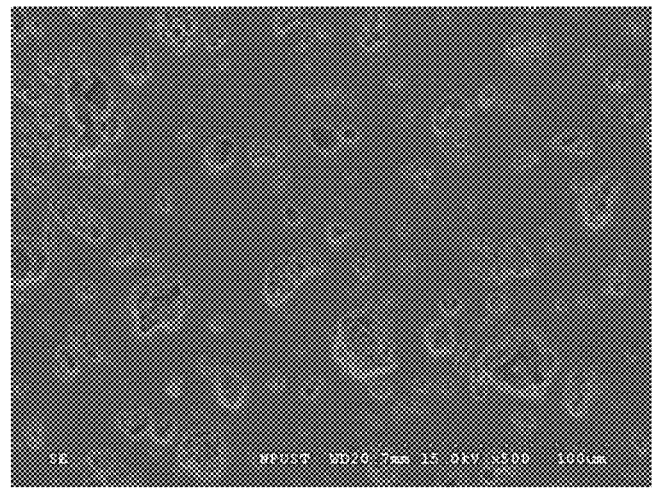
FIG. 1a depicts a cross section of a ceramic workpiece of group B0 in trial (B).

In the various figures of the drawings, the same numerals designate the same or similar parts. Furthermore, when the term "first", "second" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

A ceramic composition according to an embodiment of the present invention can include magnesium oxide (MgO), aluminum oxide ($Al_2O_3$), silicon dioxide ($SiO_2$), calcium oxide (CaO), ferric oxide ($Fe_2O_3$), sulfur trioxide ($SO_3$) and titanium oxide ($TiO_2$). As an example, the ceramic composition can include 1-8 mol % of MgO, 5-15 mol % of $Al_2O_3$, 25-40 mol % of $SiO_2$, 40-55 mol % of CaO, 0.1-8 mol % of $Fe_2O_3$, 0.1-2 mol % of $SO_3$ and 0.1-2 mol % of $TiO_2$. Preferably, the ceramic composition includes 1-2 mol % of MgO, or 0.9-2 mol % of $TiO_2$.

Moreover, the ceramic composition can include 0.1-5 mol % of an alkali metal oxide. As an example, the alkali metal oxide can be potassium oxide ($K_2O$), sodium oxide ($Na_2O$), rubidium oxide ($Rb_2O$) or cesium oxide ($Cs_2O$). As such, by the addition of the alkali metal oxide, the ceramic composition can have a lower melting point. Therefore, when the ceramic composition is used as the sintering aid, the sintering temperature of the ceramic workpieces is further reduced.

Moreover, sum of mole percentages of MgO and $Fe_2O_3$ can preferably be larger than 4 mol %. As such, the sintering temperature of the ceramic workpieces can be further reduced.

The ceramic composition can be formed by any conventional methods. As an example, a worker can grind and blend MgO, $Al_2O_3$, $SiO_2$, CaO, $Fe_2O_3$ and $SO_3$ using a ball mill. Alternatively, the worker can add a carbonate into a fly ash, followed by heating the fly ash containing the carbonate. Therefore, the ceramic composition can be synthesized. In this embodiment, a limestone with purity of calcium carbonate ($CaCO_3$) is above 85% is added into the fly ash, which mainly includes 0.1-3.5 mol % of MgO, 18-30 mol % of $Al_2O_3$, 45-66 mol % of $SiO_2$, 0.01-5 mol % of CaO, 5-26 mol % of $Fe_2O_3$, 0.1-1.5 mol % of $SO_3$ and 0.1-1.5 mol % of $TiO_2$, followed by heating to synthesize the ceramic composition.

Accordingly, due to the ingredients (MgO, $Al_2O_3$, $SiO_2$, CaO, $Fe_2O_3$, $SO_3$ and $TiO_2$) and the specific ratio (1-8 mol % of MgO, 5-15 mol % of $Al_2O_3$, 25-40 mol % of $SiO_2$, 40-55 mol % of CaO, 0.1-8 mol % of $Fe_2O_3$, 0.1-2 mol % of $SO_3$ and 0.1-2 mol % of $TiO_2$), the ceramic composition has a melting point significantly lower than gehlenite. Therefore, the ceramic composition can be used as a sintering aid and can be added into a clay ceramics. With such performance, the clay ceramics can be sintered at a temperature lower than 1200° C. to obtain a ceramic workpiece.

Moreover, the ceramic composition has a thermal decomposition temperature higher than that of $CaCO_3$. Therefore, in the process for manufacturing plastics or stone paper, the ceramic composition can be used to replace $CaCO_3$ not only to reduce the cost for manufacturing plastics or stone paper, but also to improve the properties of manufactured plastics or stone paper, such as heat resistance, size stability and hardness.

To evaluate the ceramic composition according to the present invention has the melting point lower than that of the conventional ceramic composition (that is, gehlenite), and the addition of the ceramic composition help increase the shrinkage percentage, as well as the bulk density, of the manufactured ceramic workpiece, the following trials are carried out.

Trial (A).

In trial (A), the ceramic compositions of groups A01-A10 with the specific ratio according to TABLE 1 are prepared. The melting points of the ceramic composition of groups A01-A10 are measured.

TABLE 1

| Group | $K_2O$ | MgO | $Al_2O_3$ | $SiO_2$ | CaO | $Fe_2O_3$ | $SO_3$ | $TiO_2$ |
|---|---|---|---|---|---|---|---|---|
| A01 | 1.50 | 5.32 | 12.3 | 25.80 | 48.78 | 4.68 | 0.42 | 1.20 |
| A02 | 0.51 | 2.78 | 9.12 | 30.15 | 53.21 | 2.60 | 0.97 | 0.66 |
| A03 | 0.89 | 4.44 | 8.56 | 35.20 | 44.02 | 5.78 | 0.78 | 0.33 |
| A04 | 0.56 | 5.41 | 7.74 | 30.22 | 51.99 | 2.20 | 0.45 | 1.43 |
| A05 | 1.48 | 2.37 | 12.80 | 32.72 | 42.4 | 6.38 | 0.48 | 1.37 |
| A06 | 0.63 | 3.47 | 8.10 | 37.80 | 47.06 | 1.73 | 0.55 | 0.66 |
| A07 | 0.00 | 1.82 | 8.14 | 32.78 | 52.02 | 4.33 | 0.31 | 0.60 |
| A08 | 0.00 | 2.15 | 9.22 | 31.57 | 50.5 | 5.39 | 0.72 | 0.45 |
| A09 | 0.75 | 5.11 | 8.32 | 33.70 | 45.4 | 5.27 | 1.1 | 0.35 |
| A10 | 0.33 | 2.89 | 9.37 | 30.80 | 51.89 | 3.05 | 1.01 | 0.66 |

The measured melting point of the ceramic composition of groups A01-A10 is 1153° C. (group A01), 1143° C. (group A02), 1151° C. (group A03), 1140° C. (group A04), 1141° C. (group A05), 1150° C. (group A06), 1165° C. (group A07), 1163° C. (group A08), 1137° C. (group A09) and 1135° C. (group A10), respectively. All of the measured melting points range from 1100° C. to 1200° C., and are lower than that of the conventional ceramic composition (that is, gehlenite with the melting point being about 1550° C.).

It is worthy to noted that the ceramic composition of either group A07 or group A08 has the higher melting points compared to those of the ceramic compositions of groups A01-A06 and A09-A10, suggesting that the addition of the alkali metal oxide ($K_2O$) can effectively reduce the melting point of the ceramic composition.

Trial (B).

Figure 1B:
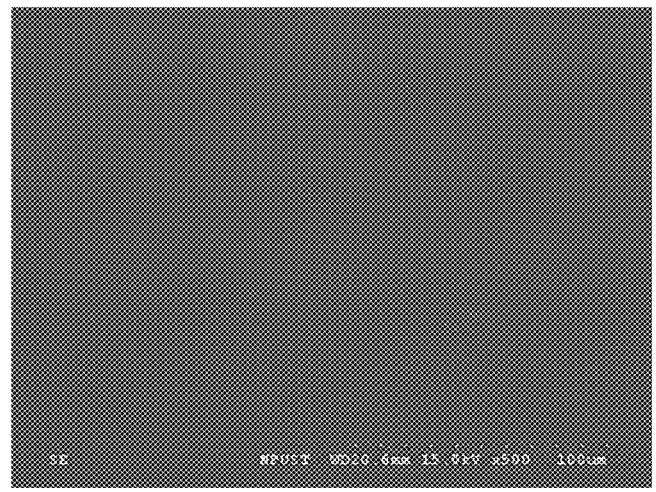
FIG. 1b depicts a cross section of a ceramic workpiece of group B1 in trial (B).

In trial (B), 15 grams of the ceramic composition of group A01 is added into 85 grams of the clay ceramics, followed by sintering the mixture to obtain the ceramic workpiece of group B1. Moreover, the clay ceramics is sintered without the addition of the ceramic composition to obtain the ceramic workpiece of group B0. The cross sections of the ceramic workpieces of groups B0-B1 are shown in FIGS. 1a and 1b. Pores are present in the cross section of the ceramic workpiece of group B0 (FIG. 1a), and the bulk density of the ceramic workpiece of group B0 is 2.1 $g/cm^3$. No obvious pores are present in the cross section of the ceramic workpiece of group B1 (FIG. 1b), and the bulk density of the ceramic workpiece of group B1 is 2.5 $g/cm^3$, suggesting that the addition of the ceramic composition help not only reduce the pores in the ceramic workpiece, but also increase the bulk density of the ceramic workpiece.

Trial (C).

Figure 2:
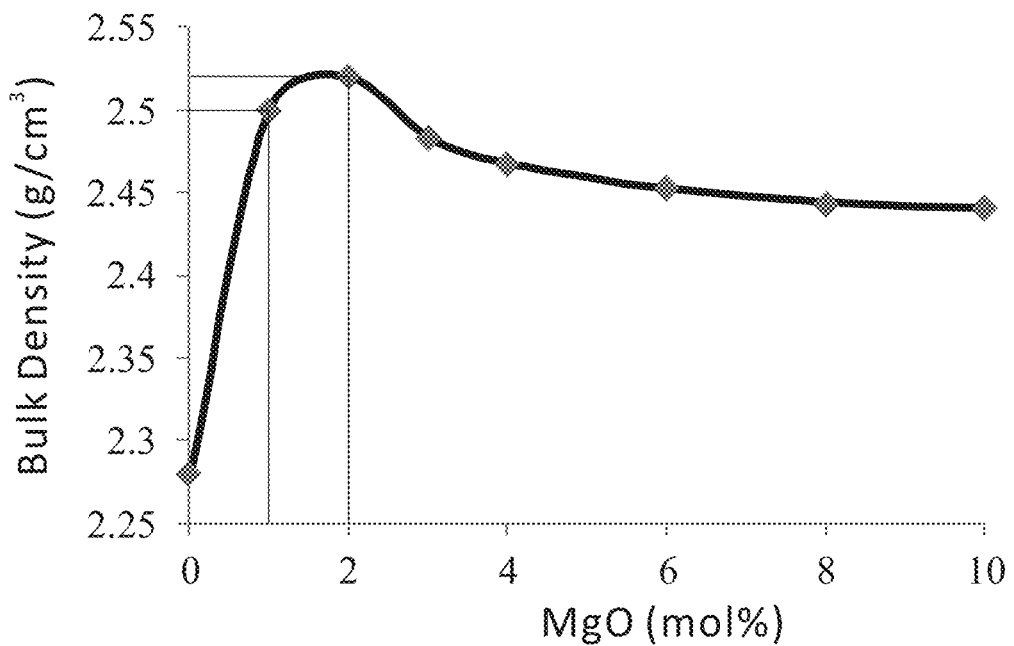
FIG. 2 depicts a line chart of MgO level versus bulk density of ceramic workpieces in trial (C).

In trial (C), the ceramic composition including 0, 1, 2, 3, 4, 6, 8 and 10 mol % MgO is added into the clay ceramics, followed by sintering the mixture to obtain the ceramic workpieces. A line chart of MgO level versus bulk density of the ceramic workpieces is shown in FIG. 2. The ceramic workpiece obtained by sintering the mixture including the ceramic composition with 1-2 mol % of MgO has a higher bulk density.

Trial (D).

Figure 3:
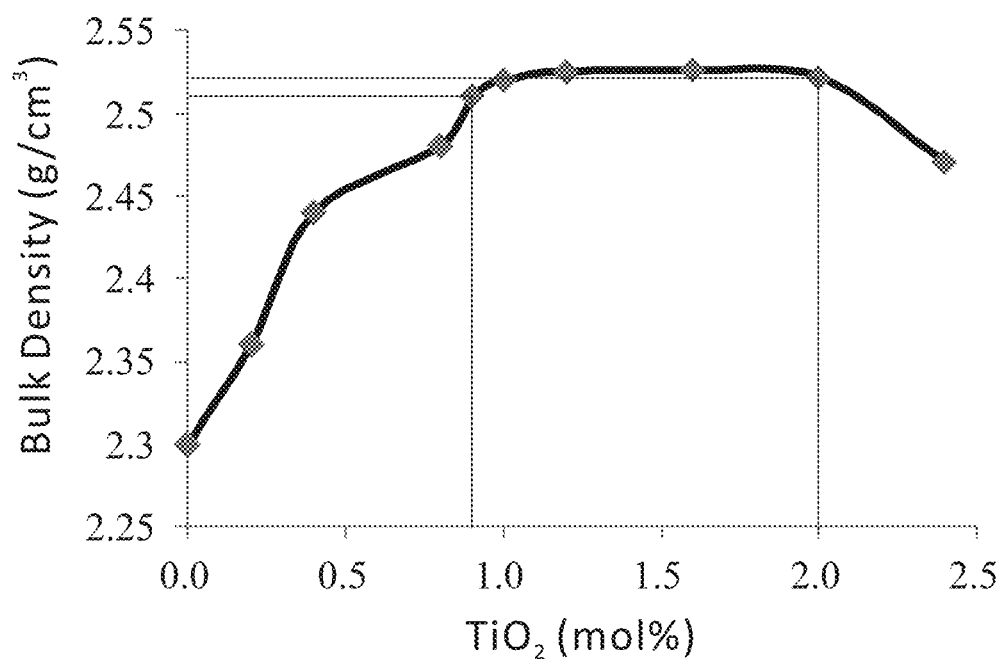
FIG. 3 depicts a line chart of $TiO_2$ level versus bulk density of ceramic workpieces in trial (D).

In trial (D), the ceramic composition including 0, 0.2, 0.4, 0.8, 0.9, 1.0, 1.2, 1.6, 2 and 2.4 mol % $TiO_2$ is added into the clay ceramics, followed by sintering the mixture to obtain the ceramic workpieces. A line chart of $TiO_2$ level versus bulk density of the ceramic workpieces is shown in FIG. 3. The ceramic workpiece obtained by sintering the mixture including the ceramic composition with 0.9-2 mol % of $TiO_2$ has a higher bulk density.

Accordingly, due to the ingredients (MgO, $Al_2O_3$, $SiO_2$, CaO, $Fe_2O_3$, $SO_3$ and $TiO_2$) and the specific ratio (1-8 mol % of MgO, 5-15 mol % of $Al_2O_3$, 25-40 mol % of $SiO_2$, 40-55 mol % of CaO, 0.1-8 mol % of $Fe_2O_3$, 0.1-2 mol % of $SO_3$ and 0.1-2 mol % of $TiO_2$), the ceramic composition has a melting point significantly lower than gehlenite. Therefore, the ceramic composition can be used as a sintering aid and can be added into a clay ceramics. With such performance, the clay ceramics can be sintered at a lower temperature lower, reducing the cost for manufacturing the ceramic workpiece.

Moreover, by co-sintering the ceramic clay with the ceramic composition including either 1-2 mol % of MgO or 0.9-2 mol % of $TiO_2$, a ceramic workpiece with an effectively improved bulk density can be obtained.

Moreover, the ceramic composition has a thermal decomposition temperature higher than that of $CaCO_3$. Therefore, in the process for manufacturing plastics or stone paper, the ceramic composition can be used to replace $CaCO_3$ not only to reduce the cost for manufacturing plastics or stone paper, but also to improve the properties of manufactured plastics or stone paper, such as heat resistance, size stability and hardness.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A ceramic composition comprising 1-2 mol % of magnesium oxide, 5-15 mol % of aluminum oxide, 25-40 mol % of silicon dioxide, 40-55 mol % of calcium oxide, 0.1-8 mol % of ferric oxide, 0.1-2 mol % of sulfur trioxide and 0.1-2 mol % of titanium oxide.

2. The ceramic composition as claimed in claim 1, wherein sum of mole percentages of magnesium oxide and ferric oxide is larger than 4 mol %.

3. The ceramic composition as claimed in claim 1, wherein the ceramic composition comprises 0.1-5 mol % of an alkali metal oxide.

4. The ceramic composition as claimed in claim 3, wherein the alkali metal oxide is selected from a group consisting of potassium oxide, sodium oxide, rubidium oxide, and cesium oxide.

* * * * *